May 4, 1937.　　　　A. BERGER　　　　2,078,997
METERING SYSTEM
Filed June 14, 1932　　　　3 Sheets-Sheet 1
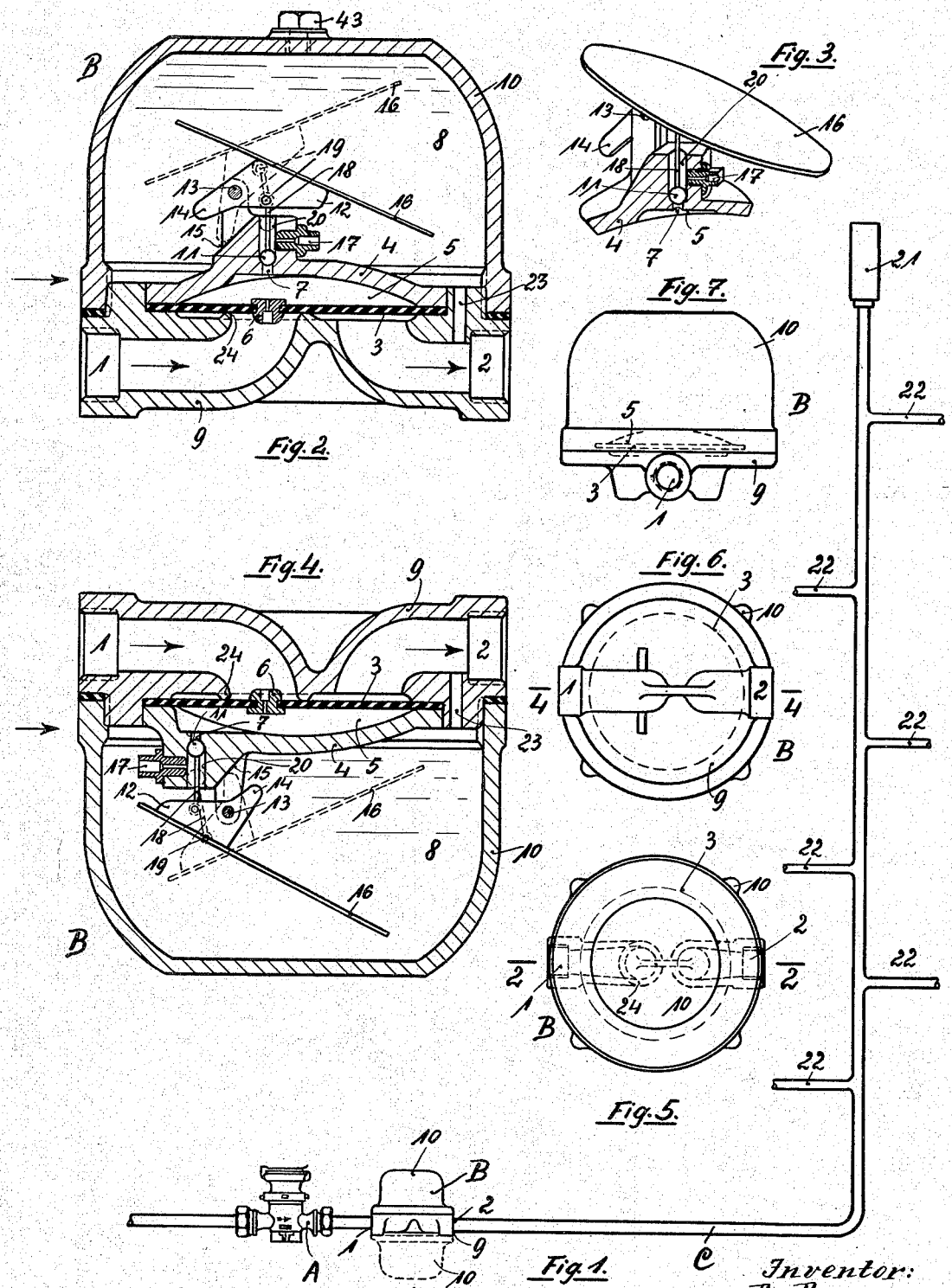
Inventor:
A. Berger
by Hans Hedin
Attorney.

May 4, 1937.  A. BERGER  2,078,997
METERING SYSTEM
Filed June 14, 1932   3 Sheets-Sheet 2
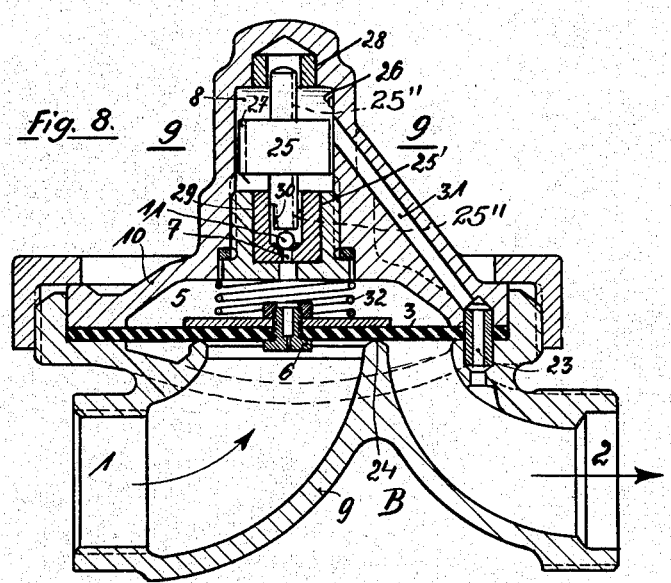
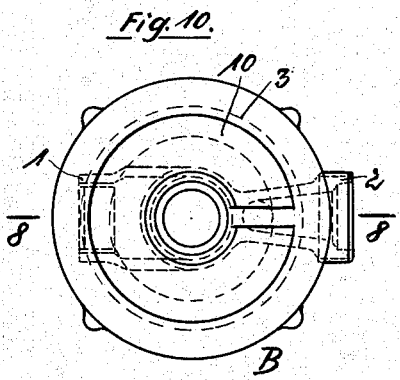
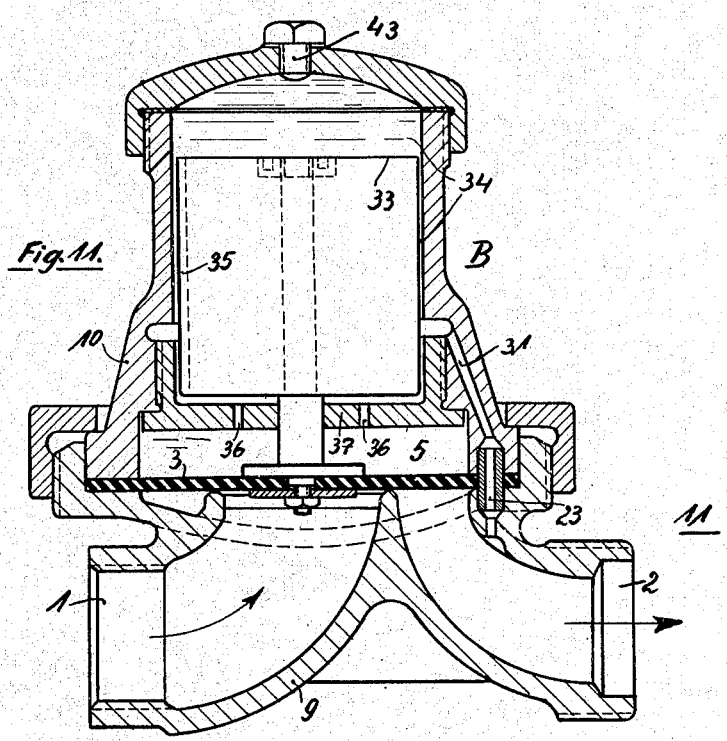
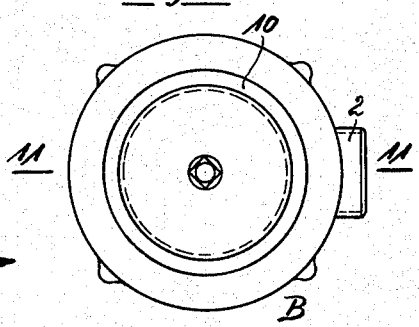
Inventor:
A. Berger.
by
Attorney.

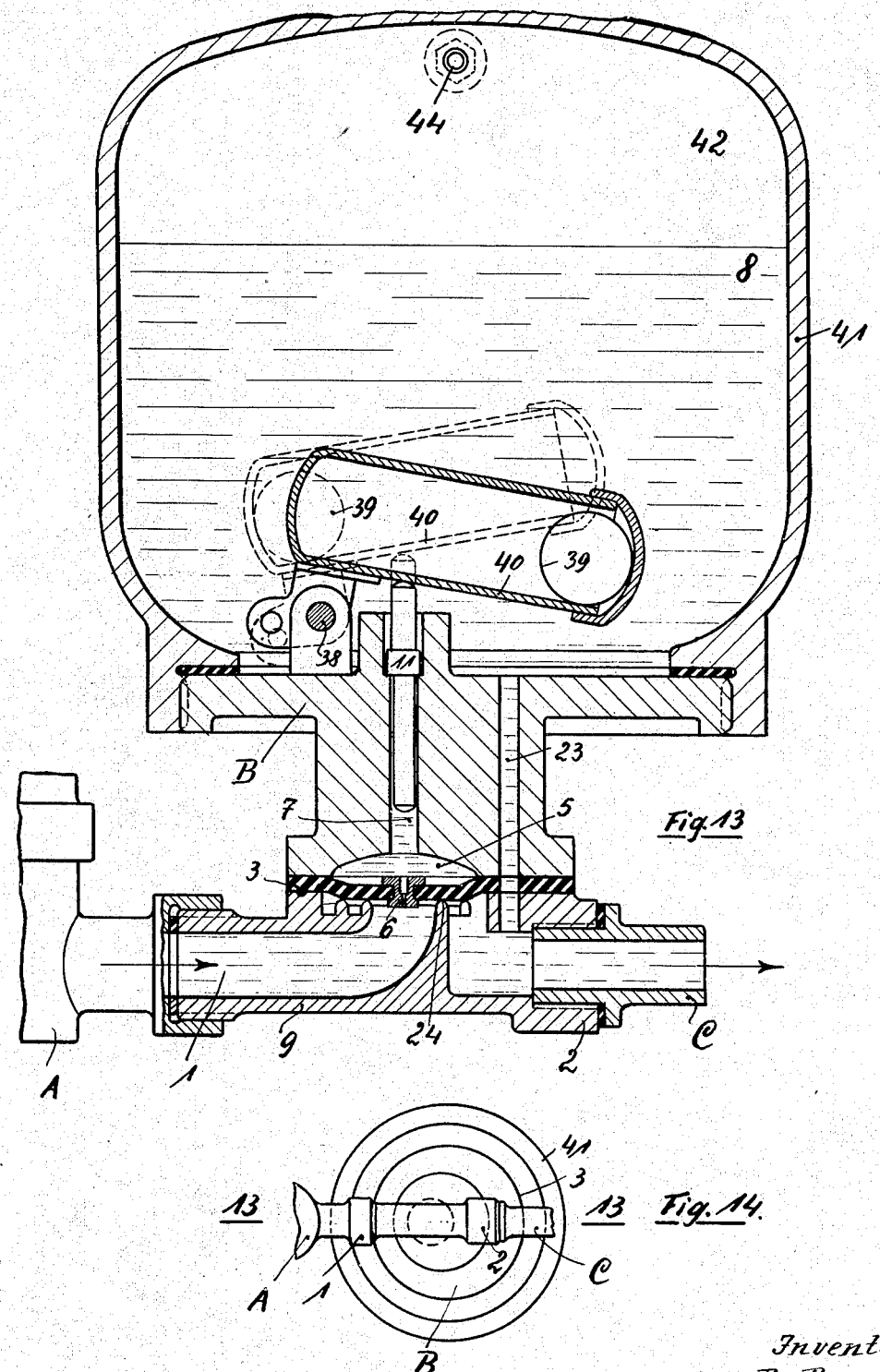

Patented May 4, 1937

2,078,997

UNITED STATES PATENT OFFICE 2,078,997

METERING SYSTEM

Alfred Berger, Breslau, Germany, assignor, by mesne assignments, to H. Meinecke, A. G., Breslau, Carlowitz, Germany Application June 14, 1932, Serial No. 617,236
In Germany September 24, 1930

4 Claims. (Cl. 50—11)

This invention relates to apparatuses which are intended to prevent liquids drawn from a pipe or other conduit and being conducted through a vane wheel liquid meter, fan liquid meter or similar measuring device flowing through the same with such a slow speed that the respective measuring device does no more respond to the action of the liquid or gives incorrect indications. These apparatuses, in the following termed "intermittence" valve, are inserted between the liquid meter and a liquid storage space permitting the continual withdrawal of the liquid and being subjected to a variable liquid pressure; such an apparatus comprises a valve device shutting off the flow of the liquid from the meter as long as it is subjected from below to the full pressure of the pipe etc., and is at the same time subjected from above to a comparatively high pressure, whereas that valve device permits the passage of the liquid when the pressure above it has fallen to a certain height owing to the withdrawal of liquid from the storage space.

In the first case liquid can, thus, be withdrawn only from the storage space while at the same time no supply of liquid to this space takes place, and in the second case the amount of liquid stored in said space is being filled up by a supply through the "intermittence" valve, the pressure in the said space being thereby increased. When a certain predetermined pressure in the store space has been reached, the "intermittence" valve closes. The controlling pressures used for the purpose in view are so determined that when the "intermittence" valve is opened the passage of the liquid through it per unit of time is with certainty so large that the indications of the meter are correct.

It is with apparatuses of this kind also possible to control the pressure to which the above-mentioned valve device (in the following briefly termed "main valve device") is subjected from above by means of an auxiliary valve device subjected on the one hand to the specific pressure to which the main valve device is subjected from above, and on the other hand to the specific pressure existing in the liquid storage space and to a load produced by a weight or by a spring, the space above the main valve device communicating through a channel with the specific pressure existing in the inlet of the "intermittence" valve.

With apparatus of this kind the main valve device and the auxiliary valve device are kept closed as long as the specific pressure existing in the stored liquid located behind the "intermittence" valve multiplied by the active surface of the operating member of the auxiliary valve device and together with the force closing this member and being produced by the load due to the action of the weight or spring, is greater than the pressure to which the main valve device is subjected from above multiplied by the there acting surface of the operating member of the auxiliary valve device. If, owing to withdrawal from the stored liquid, the pressure in the same becomes correspondingly lower, the pressure existing below the active member of the auxiliary valve lifts this member whereby the low pressure existing in the stored liquid passes also over to above the main valve, in consequence whereof also this valve is opened and the liquid flows from the main to the stored liquid, or to this and to the tapping places respectively with such a speed as is proper for correct measurement.

In order to cause the "intermittence" valve to open and to close with great precision at the predetermined specific pressures in the liquid stored behind it, the loading devices may have rolling weights which when rolling in the one or the other direction permit the valve subjected to the load of the weight to open or to close suddenly after the rolling weight has run over a certain point of its path.

Now, the main object of the present invention (among subsidiary objects dealt with later on) is, while maintaining the precise changing-over of the apparatus, to make it operate by far more quietly than has been the case heretofore and to prevent the escape of non-measured small amounts of liquid through leakages of the "intermittence" valve.

In order to attain these purposes, firstly, the main valve device may be so designed that it presents, in closed state, to the specific pressure to which it is subjected from below and which originates from the inlet of the auxiliary valve a materially smaller pressure surface than is the case with respect to the pressure to which it is subjected from above and by which the valve is closed, the space above the valve being connected with the space below it by a narrow aperture formed, preferably, by a bore in the operating member of the valve. The thus designed valve opens only at comparatively considerable falls of pressure, thus only after comparatively large amounts of the stored liquid have been withdrawn in comparatively long intervals of time, whereby the valve is prevented from "dancing". The valve device designed in the just described manner operates completely quietly, even if it is provided with a momentarily acting changing-over device (rolling weights, as already mentioned), the quiet operation being due to the throttling caused by said narrow aperture. When the changing-over device is closed, the valve closes very tightly, in that the specific pressure to which it is subjected from above is equal to the specific pressure to which it is subjected from below, whereas the size of the surfaces subjected to said pressures are very different; losses by leakage are, therefore, completely prevented. Making use of a diaphragm as operating member of the main valve device is particularly favorable for the purpose in view.

A particularly effective damping of the valve movement is obtained if a member connected with the valve device controlling the opening and the closing of the "intermittence" valve (that member being preferably one of the members constituting the loading device) is arranged in a liquid-filled vessel and is designed as a hydraulic damping member for the valve movement; that member may be a plate which is moved in the liquid and is of considerable size, or it may be a piston moved in the liquid-filled vessel and having a small bore or other passage, for instance a groove, extending from one frontal face of the piston to the other frontal face thereof. In order to provide for an accurate changing-over of the valve, that is to say, without delay, in spite of the existence of the damping device, provision may be made that a flow of liquid worth mentioning and a corresponding admission of the pressure present in the stored liquid behind the "intermittence" valve across the main valve device takes place only when the operating member of the auxiliary valve or of the main valve has made a certain stroke; where there is a rolling weight, as above mentioned, said flow of liquid may take place only about in the moment of the rolling weight moving over a certain point of its path; or where there is a damping plate, the flow of liquid may take place when the maximum of the damping has been surpassed.

The operating member effecting the opening and the closing proper of the auxiliary valve is preferably of globular shape.

The liquid storage space behind the "intermittence" valve, also the air chamber where such a one is made use of, may be formed by a hood forming part of the "intermittence" valve and enclosing also the load members for the main valve device or for the auxiliary valve device, as is all more fully dealt with hereinafter.

The invention is illustrated diagrammatically and by way of example on the accompanying drawings, on which similar letters of reference denote similar parts throughout the several views and on which Figure 1 is a representation of a plant comprising a liquid meter, an "intermittence" valve and a store of liquid enclosed in a pipe having an air-chamber on its top. Figure 2 is a vertical longitudinal section through said "intermittence" valve, this latter comprising a main valve device, an auxiliary valve device, and a damping device, the section being taken in line 2—2 of Fig. 5 which is drawn to a reduced scale relatively to Fig. 2. Figure 3 is a perspective representation of the combined auxiliary valve device and damping device, as used also in connection with the modification shown in Fig. 4. This Fig. (4) is a view similar to Fig. 2 and shows another constructional form of the "intermittence" valve, the section being taken in line 4—4 of Fig. 6 which is also drawn to a reduced scale relatively to Fig. 4. Figure 5 which is also drawn to that reduced scale is a plan of Fig. 2 and at the same time a bottom view of Fig. 4, one of the members of Fig. 2, viz, the screw 43, being omitted in order to prevent the Fig. (5) from becoming indistinct. Figure 6 (likewise drawn to the said reduced scale) is a bottom view of Fig. 2 and at the same time a plan of Fig. 4. Figure 7 (again drawn to the reduced scale) is a side-view of Fig. 2, seen in the direction indicated by the arrow at the left-hand side of Fig. 2. Figure 8 is also a vertical longitudinal section through a device designed according to this invention and shows another modification, the section being taken in the line 8—8 of Fig. 10 which is again drawn to the reduced scale. Figure 9 is a horizontal section in the plane 9—9 of Fig. 8. Figure 10 (again reduced scale) is a plan of Fig. 8. Figure 11 is a vertical section through still another modification, the section being taken in the line 11—11 of Fig. 12 which is also drawn to the reduced scale. Figure 12 is a plan of Fig. 11. Figure 13 is again a vertical longitudinal section through another constructional form, the section being taken in the line 13—13 of Fig. 14, and Figure 14 is a bottom view thereof (reduced scale).

Referring to Fig. 1, A denotes the liquid meter, B, the "intermittence valve", C the withdrawal pipe with its several branches which constitutes a storage pipe for continual withdrawal of the liquid or of a part thereof, or it constitutes a part of a line communicating with a storage vessel.

Referring to Fig. 2, 1 denotes the passage through which the interior of the "intermittence" valve B is connected with the liquid meter A; 2 is the oppositely located passage through which the liquid leaves the "intermittence" valve. The inner ends of said passages are separated from one another by a diaphragm 3 which when being in its position of rest, as in said figure, separates said passages from one another and presents to the pressure acting upon it from above a larger surface than to the pressure acting upon it from below. Above the diaphragm is formed a chamber 5 by a practically concavo-convex plate 4, this chamber communicating with the passage 1 through a nozzle-like member 6 having a narrow bore; the chamber 5 communicates, besides, through a channel 7 with a vessel 8 formed by a hood 10 and being filled with liquid. The channel 7 forms in its interior a seat for a ball 11 which is subjected to the action of a loading device.

In the example shown in Figs. 2 and 3 the loading device consists of a body member 12 which is hinged at 13 to an upwardly directed projection of the plate 4 and has a lug 14 contacting with an elevated central portion 15 of the plate 4 when a plate 16 secured to the body member 12 has been moved from the position shown in full lines to the position shown in dotted lines, the members 14 and 15 acting then as abutments. When the plate 16 is in the position shown in full lines, the auxiliary valve device is closed, that is to say, the ball 11 is on its seat in the channel 7. When the plate 16 is in the position shown in dotted lines, said valve is open, the ball 11 being now situated above said seat. While the plate 16 is being moved in the one or the other direction it acts as a damping member in the liquid.

The constructional form shown in Fig. 4 is distinguished from that shown in Fig. 2 thereby that it is inverted, or turned upside down. Besides, the loading device is arranged a little more laterally. In Fig. 2 the loading device acts as a one-armed lever, in Fig. 4 it acts as a double-armed lever. In the inverted form (Fig. 4) the vessel 8 is particularly securely kept continually filled with the liquid.

In order to attain, in spite of said damping action, the change-over of the valve that takes place very accurately, a passage 17 is provided between the channel 7 and the vessel 8, and this passage is so located that the communication between the channel 7 and the vessel 8 is established when the plate 16 has attained its horizontal position in which its momentum is the greatest. Instantly when the passage 17 has been opened, the momentum of the plate 16 decreases again so that when this latter has reached said position the passage 17 is opened quickly, but not momentarily, in spite of its hydraulic braking. From Fig. 2 it appears that the inner end of the passage 17 is very narrow.

The valve member 11 is preferably designed as a ball, as in Figs. 2 and 4, and it is in both cases connected with the loading device, or the plate 16 respectively, by means of a rod 18 hinged at the point 19 to the body member 12. It is obvious that this arrangement and combination of the parts is very simple and operates very reliably, because the sectional area of the valve 11 is everywhere the same; the ball is securely guided and closes tightly.

The diameter of that portion of the bore 20 which is located above the valve ball is only very slightly larger than the diameter of this ball so that the exchange of liquid between the chamber 5 and vessel 8 takes place chiefly through the channel 17.

The vessel 8 is always filled with liquid. The stored liquid which is to be withdrawn in small quantities per unit of time is contained in the vertical pipe C (Fig. 1) which is preferably provided with an air vessel 21 located preferably at the uppermost end of said pipe. Said vessel 21 takes part in the generation of the varying pressure requisite for the proper operation of the "intermittence" valve B. 22 denotes branches of the pipe C where the liquid can be withdrawn.

23 is a connection between the vessel 8 and the discharge passage 2 of the "intermittence" valve and, thus, also with the pipe C.

In Fig. 2, as well as in Fig. 4, that surface of the diaphragm 5 which is located opposite the pressure coming from the entrance to the "intermittence valve" presents, when the diaphragm is in that position in which the passages 1 and 2 are closed, a considerably smaller area of action for the pressure coming from the passage 1 than is the case at the surface where the diaphragm is subjected to the pressure existing in the chamber 5 so that a very powerful closing pressure is attained, and for opening the communication between the passages 1 and 2 a considerable fall of pressure in the chamber 5 is necessitated. Losses by leakage at the valve seat can not occur, nor can a quick reversal of stroke take place at small fluctuations of pressure in the stored liquid, so that also dancing of the valve is prevented. The perforation in the diaphragm is only small, so that it also acts damping.

In the constructional form illustrated in Figs. 8–10 the ball 11 of the auxiliary valve is loaded with a weight designed as a piston 25 moving in a vessel 8 filled with liquid whereby the damping of the auxiliary valve device is effected. The vessel 8 is formed by a cylinder 26 in which the weight or piston 25 can move with such clearance that thereby the desired damping action is attained, of if the clearance is only slight an axial groove 27 may be provided as in Figs. 8 and 9. Also the pivot-like extensions above and below the piston 25 may have a certain clearance permitting a sufficient passage of the liquid in the guide members 28 and 29 provided for said extensions and consisting preferably of hard rubber, but instead of such clearances grooves like 27 may be provided also in said extensions or pivots. 25′ in Fig. 8 denotes such grooves.

In the example shown in Fig. 8 the lower extension 25′ has a groove 30 which is shorter than said extension and permits the passage of a large amount of liquid only after the piston has made a certain stroke, i. e., part stroke. The supply of the liquid from the pipe C to the space 8 takes place in this case through the channel 23 and the passage 31. 32 is a helical compression spring by which the diaphragm is subjected to an additional load.

Referring now to the further example shown in Figs. 11 and 12, there is in this case no auxiliary valve device provided. The diaphragm 3 is connected directly with the damping device which consists of the additional loading weight 33 that moves in the liquid-filled cylinder 34 either with a certain clearance or is provided with a lateral groove 35 whereby in either case the damping is obtained. The pipe C (Fig. 1) communicates with the interior of the cylinder 34 through the passage 23 and the channel 31, and the chamber 5 communicates with the cylinder 34 through bores 36 provided in the bottom plate 37 of the cylinder. Anyhow, this plate with its bores may, if desired, be dispensed with.

In the further example shown in Figs. 13 and 14 the valve is damped merely by means of the narrow aperture in the nozzle 6 provided in the diaphragm 3. Within the hood 41 is a turnable closed casing 40 which is located on a pivot 38 and contains a weight 39 having the shape of a ball. The hood 41 operates in this constructional form of the device also as an air vessel so that the air vessel 21 of Fig. 1 can be dispensed with, whereby the plant is simplified and the number of places where a leakage is possible is reduced.

The manner of operation of the devices shown in the Figs. 1–10 and in the Figs. 13 and 14 is as follows:

As long as the diaphragm keeps the communication between the passages 1 and 2 interrupted, and the auxiliary valve device is closed, the pressure in the chamber 5 is the same pressure as in the supply passage. If equilibrium exists between the pressure exerted in the chamber 5 upon the valve ball 11 and the pressure exerted upon this ball from the opposite side (this pressure being that exerted by the liquid plus that exerted by the additional weight), or if the pressure in the chamber 5 is lower than the pressure on the other side, the auxiliary valve device, as well as the main valve device, remain closed, and the liquid can be withdrawn solely from the storage contained in the pipe C and in the air vessel 21 (Fig. 1), or 42 (Fig. 13).

When by reason of the withdrawal of liquid from that storage the pressure to which the storage had been subjected has so much fallen that the pressure in the chamber 5 is correspondingly higher than the pressure on the opposite side of the auxiliary valve operating member, first the valve 11 of the auxiliary valve device is slowly lifted, and when the valve 11 has moved past the nozzle 17 (Figs. 2 and 4) or when the ball 39 (Fig. 13) has moved from the position shown in full lines in this figure into the position shown in dotted lines, the valve 11 is further moved, but now quickly. Now the slight pressure present in the vessel 8 (Figs. 2 and 4) or in the air space 42 of the hood 41 (Fig. 13) arises also in the chamber 5. The dimensions of the valve seat or partition 24 (Fig. 13), the area of this valve or diaphragm at the chamber 5, and the ratios of the pressures, are so determined that when said slight pressure arises also in the chamber 5 the diaphragm is lifted from its seat and now the liquid stored in the chamber 8 (Figs. 2, 4, and 8), or 34 (Fig. 11) respectively, and in the pipe C, as well as the pressure, are quickly filled up through the channels 23, or 23 and 31 respectively, which takes place with that speed at which the indications of the liquid meter are correct. There is then also a direct passage of the liquid to the places of withdrawal possible. When in the spaces behind the "intermittence" valve B and in the pressure vessel 8 again a pressure has been reached at which the closing of the valve is rendered possible, the diaphragm is again pressed firmly upon its seat by the equalization of the specific pressure above and below the diaphragm.

As regards the manner of operation of the constructional form show in Figs. 11 and 12, the valve is opened when the pressure in the stored liquid in the pipe C has so much fallen that the sum of the forces acting upon the diaphragm from above has become smaller than the force acting, when the valve is closed, upon the lower surface of the diaphragm (lower active surface of the diaphragm) multiplied by the pressure in the pipe, and the valve will be closed when the pressure produced by the filling up of the liquid stored in the pipe C, multiplied by the upper active surface and together with the force exerted by the load has again become as high as the pressure in the passage 1 multiplied by the entire lower active surface of the diaphragm.

The hydraulic damping devices described on the above pages and shown by way of example on the drawings cause quiet, but nevertheless perfectly reliable operation of the valves and this manner of operation is assisted and rendered perfectly certain by the arrangement of the diaphragm 3 with its narrow aperture in the nozzle 6. The speed of the opening and of the closing operation can be influenced not only by the damping force, but also by appropriate choice of the several bores (for instance as regards the just mentioned aperture or bore 6 and the passage or bore 17), the suitable size of which for the different sizes and constructional forms of the device can be ascertained by a few tests.

43 in Fig. 11 denotes a deaeration screw of the cylinder 34, and 44 in Fig. 13 denotes a connection with an air conduit in order to supply air to the air vessel 41, if necessary. Such members 43 and 44 may be provided also at the other constructional forms of the device.

The advantages presented by the hydraulic damping and by the provision of the auxiliary valve device so designed that it opens when the action of the load, after having surpassed a certain maximum, again decreases, finally, the design of the valve cone of the auxiliary valve device as a ball, are obtained also in connection with completely relieved main valve devices in which the closing is effected solely either by their weight or by a spring. Under the term "completely relieved valve" I comprehend a valve, the movable closing member (cone or ball or the like) of which is on both sides subjected to pressure, the pressures acting on surfaces of equal size.

I claim:

1. An intermittence valve device for use in connection with liquid meters, comprising in combination a casing having an inlet passage and an outlet passage separated by a partition, a shutting-off member in said casing adapted to normally bear against said partition and prevent flow of liquid from said inlet passage to said outlet passage, a chamber on the side of said shutting off member remote from said inlet and outlet passages and communicating with said inlet passage through said shutting off member, a liquid filled vessel on said casing covering said chamber and communicating with said chamber and said outlet passage, an upwardly opening auxiliary valve in the connection between said vessel and said chamber, and a loading body in said vessel acting by its weight on said auxiliary valve to close said valve and of such shape that its movements in said vessel are damped.

2. An intermittence valve device for use in connection with liquid meters, comprising in combination a casing having an inlet passage and an outlet passage separated by a partition, a shutting-off member in said casing adapted to normally bear against said partition and prevent flow of liquid from said inlet passage to said outlet passage, a chamber on the side of said shutting off member remote from said inlet and outlet passages and communicating with said inlet passage through said shutting off member, a liquid filled vessel on said casing covering said chamber and communicating with said chamber and said outlet passage so that said chamber and outlet passage are also filled with liquid, and means in said vessel for regulating the flow of liquid between said vessel and said chamber and a piston in said vessel acting to close said regulating means and damp the opening and closing movements of said shutting off member.

3. An intermittence valve device for use in connection with liquid meters, comprising in combination a casing having an inlet passage and an outlet passage separated by a partition, a shutting-off member in said casing adapted to normally bear against said partition and prevent flow of liquid from said inlet passage to said outlet passage, a chamber on the side of said shutting-off member remote from said inlet and outlet passages and communicating with said inlet passage through said shutting off member, a liquid filled vessel on said casing covering said chamber and communicating with said chamber and said outlet passage, an auxiliary valve in the communication between said vessel and said chamber, a piston shiftable in said vessel, a concentric cylindrical extension on the under side of said piston and loading said auxiliary valve, said extension having a lateral groove extending from the lower end of said extension and terminating when said auxiliary valve is closed a short distance below the upper edge of the guiding of the extension, said groove adapted to establish communication between said auxiliary valve and said vessel after said piston has performed a predetermined stroke.

4. An intermittence valve device for use in connection with liquid meters as specified in claim 1, comprising in combination with the casing having an inlet passage and an outlet passage, and said shutting off member including a diaphragm having a narrow aperture.

ALFRED BERGER.